United States Patent
Kuo

(10) Patent No.: US 6,763,914 B2
(45) Date of Patent: Jul. 20, 2004

(54) SELF-LUBRICATION CABLE ASSEMBLY

(76) Inventor: Yung-Pin Kuo, No. 55 Alley 121, Lane 175, Kuo Shen Rd., Chang Hwa City (TW)

( * ) Notice: Subject to any disclaimer, the term of this patent is extended or adjusted under 35 U.S.C. 154(b) by 84 days.

(21) Appl. No.: 10/178,490

(22) Filed: Jun. 25, 2002

(65) Prior Publication Data

US 2003/0146054 A1 Aug. 7, 2003

(51) Int. Cl.$^7$ .................................................. F16N 1/00
(52) U.S. Cl. ..................... 184/15.1; 74/500.5; 74/502.4
(58) Field of Search .............................. 184/15.1, 15.3, 184/16; 277/630, 641, 910; 74/500.5, 501.6, 502, 502.2, 502.3, 502.4, 502.5, 502.6

(56) References Cited

U.S. PATENT DOCUMENTS

| | | | | |
|---|---|---|---|---|
| 1,589,108 A | * | 6/1926 | Caretta | 74/502.6 |
| 4,066,147 A | * | 1/1978 | Toyomoto | 184/15.1 |
| 4,749,059 A | * | 6/1988 | Jonnes et al. | 184/15.1 |
| 5,326,292 A | * | 7/1994 | Brushaber | 74/502.6 |
| 5,662,189 A | * | 9/1997 | Anderson et al. | 184/15.2 |
| 5,988,011 A | * | 11/1999 | Crepin | 74/502.4 |

\* cited by examiner

*Primary Examiner*—David A. Bucci
*Assistant Examiner*—Timothy McAnulty
(74) *Attorney, Agent, or Firm*—Rosenberg, Klein & Lee

(57) ABSTRACT

A brake cable assembly includes a cable movably received in a sheath and an outer tube is mounted to the sheath and has an aperture defined through a wall of the outer tube. A shoulder extends inward from an inner periphery of the outer tube. A lubrication sleeve is received in the outer tube and contacts an end surface of the shoulder. Lubrication liquid is dropped to the lubrication sleeve via the aperture. The cable extends through the lubrication sleeve so as to be lubricated during operation. A seal member seals the aperture.

1 Claim, 5 Drawing Sheets

SELF-LUBRICATION CABLE ASSEMBLY

FIELD OF THE INVENTION

The present invention relates to a self-lubrication cable assembly wherein a lubrication sleeve is received in the sheath and the cable movably extends through the lubrication sleeve so that the cable is lubricated during operation.

BACKGROUND OF THE INVENTION

A conventional brake cable assembly is shown in FIG. 10 and generally includes a metal cable 10 which is protected by a plastic sheath 20 and the cable 10 is movably in the sheath 20. An end piece 100 is connected to the cable 10 and a metal fastener 60 is secured on the plastic sheath 20. The end piece 100 is connected to the brake lever so that when pulling the brake lever, the brake cable 10 is pulled to activate the brake mechanism. The cable 10 is supposed to be moved in the sheath 20 at less friction so as to quickly response the braking action. However, the brake cable 10 lacks of lubrication and it contacts the sheath 20 so that it is pulled at a large friction which could shorten the term of lift of the brake cable 10. The cable 10 gets rust if humidity is remained in the sheath.

The present invention intends to provide a self-lubrication cable assembly wherein a lubrication sleeve is received in the sheath so as to lubricate the cable all the time.

SUMMARY OF THE INVENTION

In accordance with one aspect of the present invention, there is provided a brake cable assembly which comprises a cable movably received in a sheath and an outer tube is mounted to the sheath which has an aperture defined through a wall thereof. A shoulder extends inward from an inner periphery of the outer tube and a lubrication sleeve is received in the outer tube. An end of the lubrication sleeve contacts an end surface of the shoulder and the other end of the lubrication sleeve contacts an end of the sheath. The aperture communicates with the lubrication sleeve.

The primary object of the present invention is to provide a cable assembly that has a lubrication sleeve which provides lubrication to the cable extending through the sleeve.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
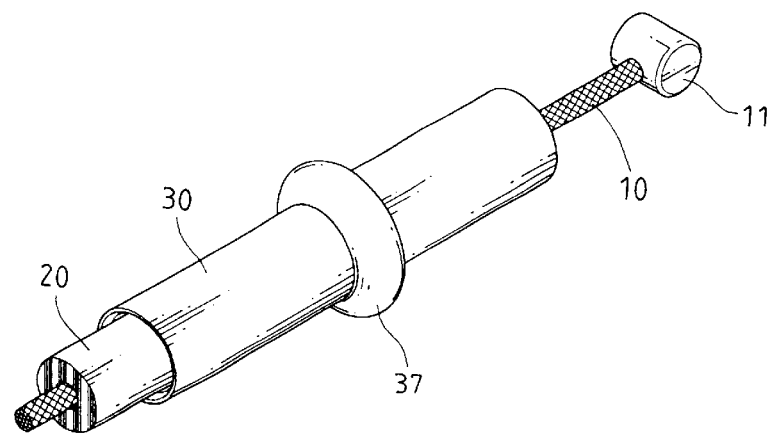
FIG. 1 is a perspective view to show the cable assembly of the present invention.
Figure 2:
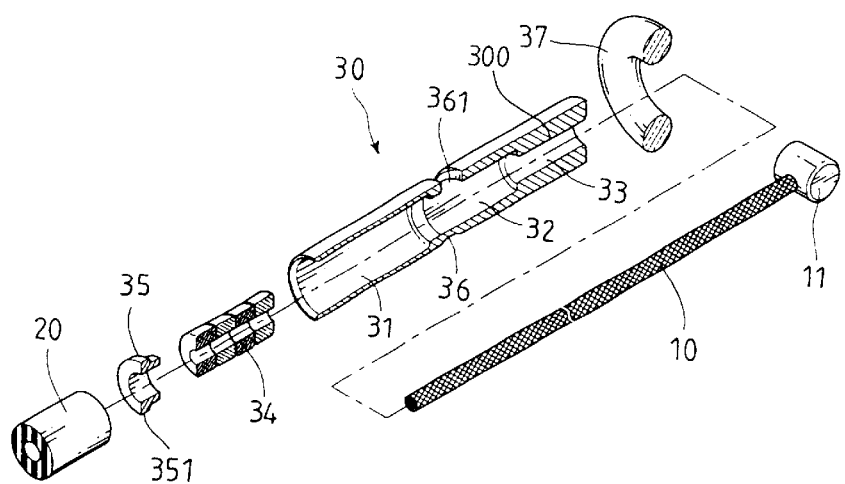
FIG. 2 is an exploded view to show the cable assembly of the present invention.
Figure 3:
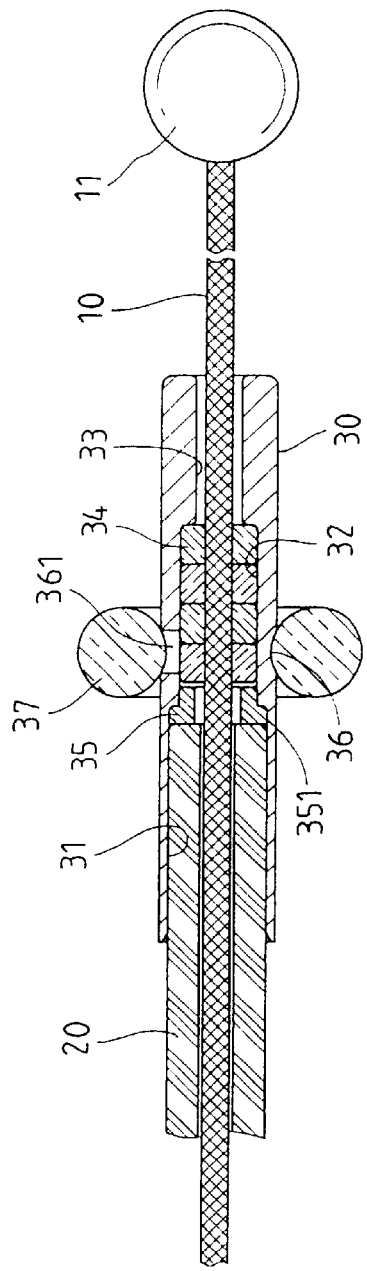
FIG. 3 is a cross sectional view to show the cable assembly of the present invention.

Referring to FIGS. 1 to 3, the self-lubrication cable assembly of the present invention comprises a cable 10 which is movably received in a sheath 20. An outer tube 30 has a passage and an end of the sheath 20 is received in the passage. An aperture 361 is defined through a wall of the outer tube 30 and communicates with the passage. A groove 36 is defined in an outer periphery of the outer tube 30 and the aperture 361 is located in the groove 36. The groove 36 is made by rimming at the outer periphery of the outer tube 30 so as to from an annular flange extending inward from the passage. A shoulder 300 extends inward from an inner periphery of the passage of the outer tube 30. The passage includes a first section 31, a second section 32 and a third section 33. The first section 31 starts from an open end of the outer tube 30 to the annular flange. The second section 32 starts from the annular flange to the shoulder 300, and the third section 33 is enclosed by the shoulder 300.

Figure 5:
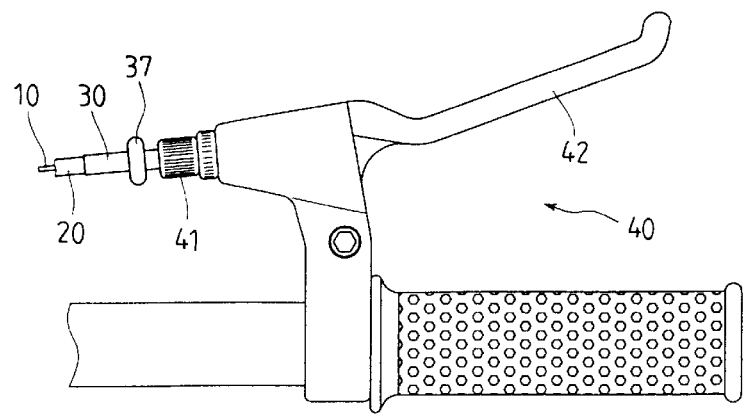
FIG. 5 shows the cable assembly of the present invention is connected with a brake lever.
Figure 6A:
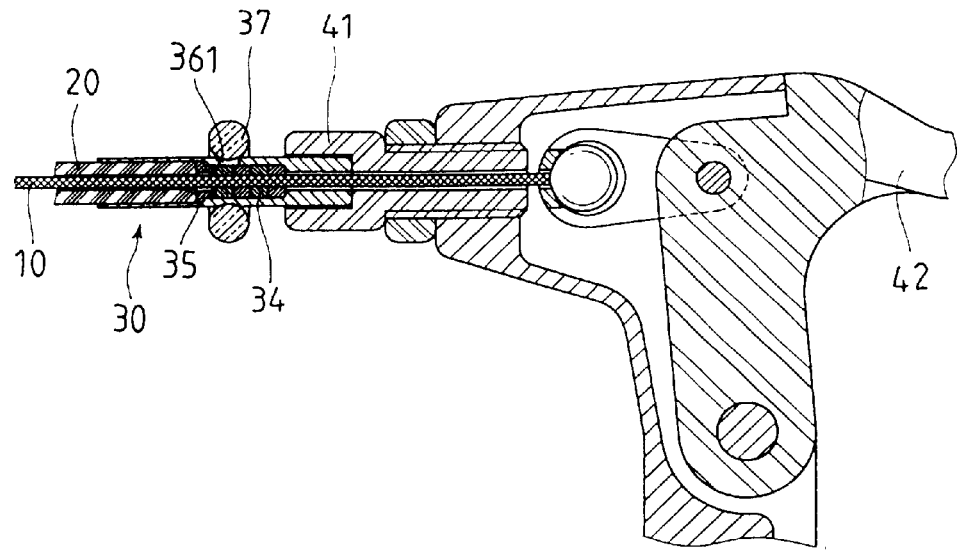
FIG. 6A is a cross sectional view to show the cable assembly of the present invention is connected to a brake lever.
Figure 6B:
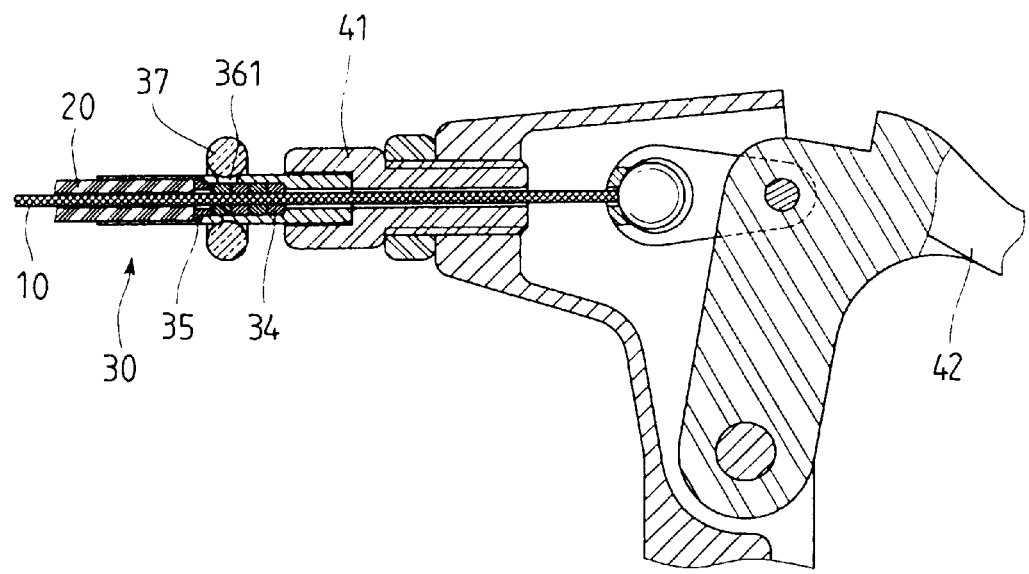
FIG. 6B is a cross sectional view to show the cable is pulled when the brake lever is pulled.

A lubrication sleeve 34 is received in the second section 32 in the outer tube 30 and an end of the lubrication sleeve 34 contacts an end surface of the shoulder 300. An end cap 35 is engaged with an end of the lubrication sleeve 34 and has a flange 351 which is engaged with the annular flange. The other end of the lubrication sleeve 34 contacts an end of the sheath 20 which is inserted in the first section 31. The aperture 361 communicates with second section 32 where the lubrication sleeve 34 in received. A seal member 37 which is a seal ring mounted to the groove 36 and seals the aperture 361. The cable 10 extends through the sheath 20, the end cap 35, the lubrication sleeve 34 and the third section 33. An end member 11 is connected to an end of the cable 10 so as to be connected to a brake lever 42 as shown in FIGS. 5, 6A and 6B.

Figure 4:
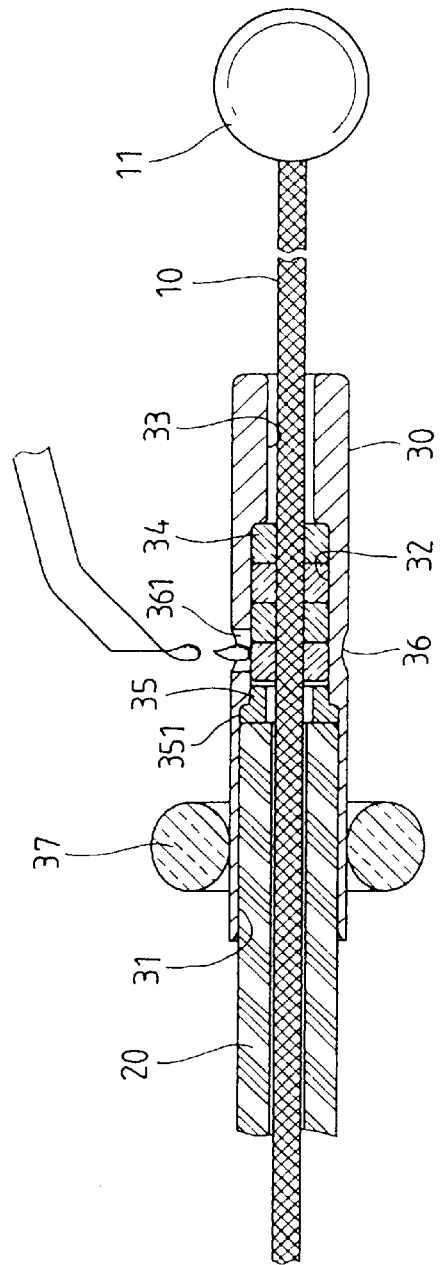
FIG. 4 is a cross sectional view to show that lubrication oil drops enter into the outer tube via the aperture.

As shown in FIG. 4, the seal member 37 may be removed from the groove 36 and lubrication liquid may enter to the lubrication sleeve 34 via the aperture 361. Therefore, when the brake lever 42 as shown in FIG. 6B, the cable 10 is lubricated during operation.

Figure 7:
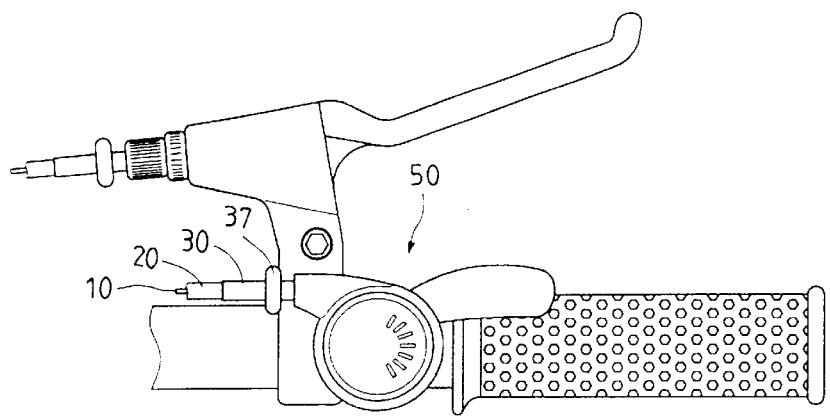
FIG. 7 shows the cable assembly of the present invention is connected to a derailleur shifter.
Figure 8:
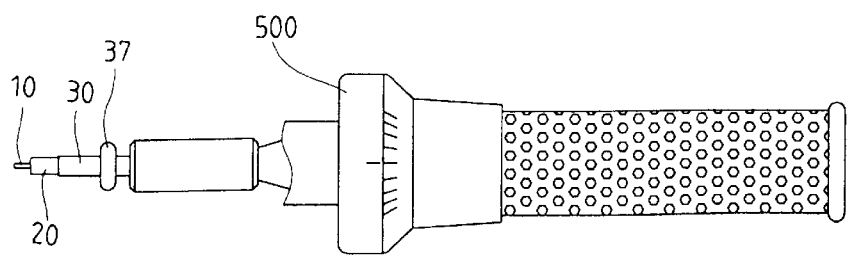
FIG. 8 shows the cable assembly of the present invention is connected to a handlebar grip type derailleur shifter.

FIG. 7 shows that the cable 10 is connected to a derailleur shifter 50. FIG. 8 shows that the cable 10 is connected to a handlebar grip type derailleur shifter 500.

Figure 9:
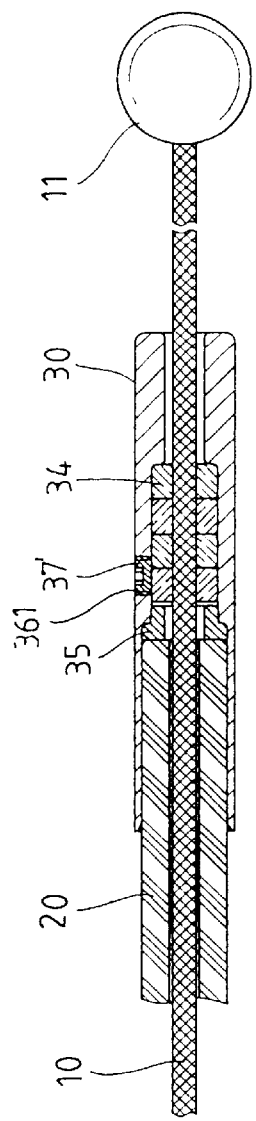
FIG. 9 shows another embodiment of the seal member.
Figure 10:
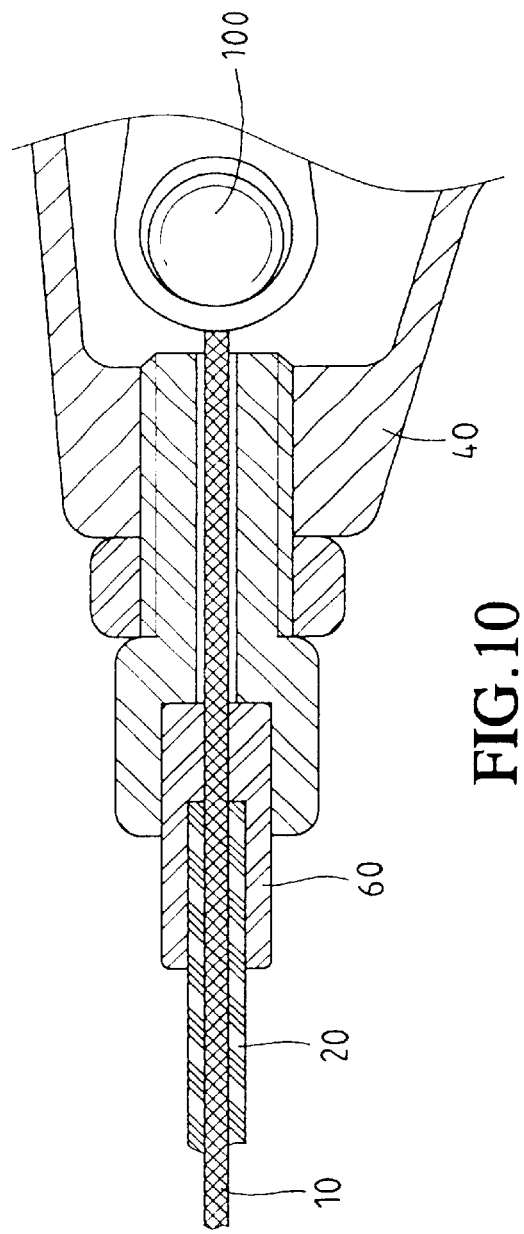
FIG. 10 is a cross sectional view to show a conventional cable assembly connected to a brake lever.

FIG. 9 shows that the seal member 37' is a screw which is threadedly engaged with the aperture 361.

While we have shown and described the embodiment in accordance with the present invention, it should be clear to those skilled in the art that further embodiments may be made without departing from the scope of the present invention.

What is claimed is:

1. A self-lubricating brake cable assembly comprising:
   (a) a cable having a distal actuating end and a proximal operating end;
   (b) a sheath slidingly mounted on said cable;
   (c) an outer tube having a first section, a second section and a third section, and defining a central passageway extending axially through said tube and defining at least one circumferential annular groove on an outer periphery of said outer tube, said at least one annular groove forming at least one annular flange extending into the central passageway, said first section of said outer tube receiving said sheath with said cable therein and said outer tube further having at least one aperture defined through a wall of the outer tube and located at said at least one annular groove, and a shoulder enclosed by said third section and extending inward from an inner periphery of the outer tube;

(d) a substantially cylindrical lubrication sleeve contiguous with said cable that is received in a central channel defined in said lubrication sleeve which is received within said second section of the outer tube and having a proximal end of the lubrication sleeve contacting an end surface of the shoulder, and a distal end of the lubrication sleeve contacting an endcap formed with a flange fixedly received within said first section and positioned adjacent to a proximal termination of the sheath, the aperture being in fluid communication with the lubrication sleeve; and (e) means for reversibly sealing said aperture on said outer periphery; wherein said cable is slidingly contiguous with said lubrication sleeve and said lubrication sleeve functions as a depot for a lubricant and maintains an unmoving positional relationship with said outer tube, said means for reversibly sealing said aperture including a sealing member displaceable on said outer tube for reversible engagement with said annular groove.

* * * * *